Figure 1:
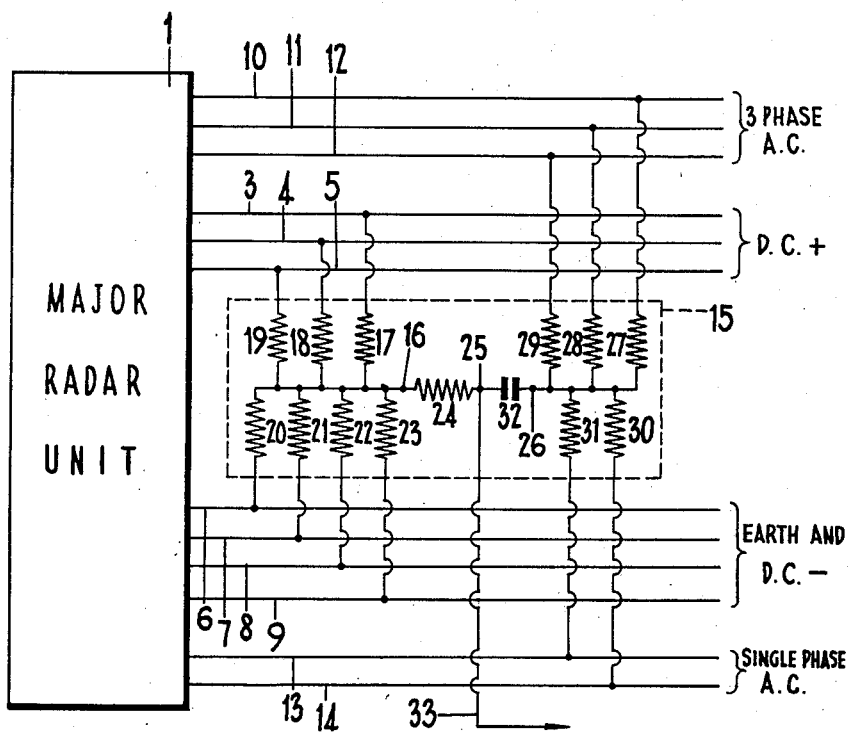

May 23, 1961   F. C. FLINT   2,985,831
EQUIPMENT FOR CHECKING A PLURALITY OF ELECTRIC SUPPLIES
Filed May 2, 1957   2 Sheets-Sheet 1

INVENTOR
FREDERICK CHARLES FLINT
BY
ATTORNEYS

May 23, 1961 F. C. FLINT 2,985,831
EQUIPMENT FOR CHECKING A PLURALITY OF ELECTRIC SUPPLIES
Filed May 2, 1957 2 Sheets-Sheet 2

INVENTOR
FREDERICK CHARLES FLINT
BY
ATTORNEYS

United States Patent Office 2,985,831
Patented May 23, 1961

2,985,831
EQUIPMENT FOR CHECKING A PLURALITY OF ELECTRIC SUPPLIES

Frederick Charles Flint, Stanmore, England, assignor to The General Electric Company Limited, Magnet House, London, England Filed May 2, 1957, Ser. No. 656,528
Claims priority, application Great Britain, May 4, 1956
7 Claims. (Cl. 324—73)

This invention relates to equipment for checking a plurality of electric supplies.

According to one aspect of the present invention, equipment for checking a plurality of electric supplies comprises means for deriving a single electric signal from said plurality of electric supplies and means responsive to said electric signal, the arrangement being such that a failure of any one of said electric supplies results in said electric signal having a detectable difference compared with when there is no such failure while the second mentioned means is adapted to detect any such difference, the second mentioned means being arranged to give an indication or effect a control when the failure of any one of the supplies is detected thereby.

The said supplies may all have the same voltage or alternatively they may have different voltages and the supplies may be of the same or different frequencies. The equipment may be used for checking the electric supplies periodically or as part of a sequence of tests. Alternatively the equipment may be arranged to carry out a continuous check of the electric supplies in order to detect immediately the failure of any one of those supplies.

If the said plurality of electric supplies comprises two or more supplies having the same frequency (either zero frequency, namely direct current, or otherwise), the first mentioned means may be arranged so that the said signal supplied thereby contains a component having the said frequency (or is formed by a signal of that frequency if the said plurality of supplies all have the same frequency) the voltage of which is dependent upon the voltage of all the said supplies of the said frequennecy. If the said plurality of electric supplies comprises two or more alternating current supplies of different frequencies, the first mentioned means may be arranged so that the said signal supplied thereby contains or consists of a plurality of alternating current components each corresponding to one or more of the said alternating current supplies of a particular frequency and each such component having the frequency of the corresponding supply or supplies while the voltage of each such component is dependent upon the voltage of all the supplies having the same frequency as that component. In this case the second mentioned means may be adapted to derive a single direct current signal the voltage of which is dependent upon the voltage of all the said alternating current components and include means responsive to the voltage of this derived direct current signal to give an indication or effect a control as aforesaid upon the failure of an alternating current supply.

Furthermore, if the said plurality of supplies include both direct current and alternating current supplies, the first mentioned means may be arranged so that the said signal supplied thereby contains a direct current component the voltage of which is dependent upon the voltage of all the said direct current supplies and one or more alternating current components the voltage of which is, or the voltages of which are, dependent upon the voltages of all the alternating current supplies while the second mentioned means may comprises two circuits, parts of which may be common, and which circuits are arranged one to be operated in dependence upon the voltage of the direct current component to check the direct current supplies and one arranged to be operated in dependence upon the voltage or voltages of the alternating current component or components to check the alternating current supplies.

According to another aspect of the present invention, there is provided, for the purpose of checking a plurality of electric supplies, means for deriving a single electric signal from said plurality of electric supplies, the arrangement being such that a failure of any one of said electric supplies results in said electric signal having a detectable difference compared with when there is no such failure.

Figure 2:
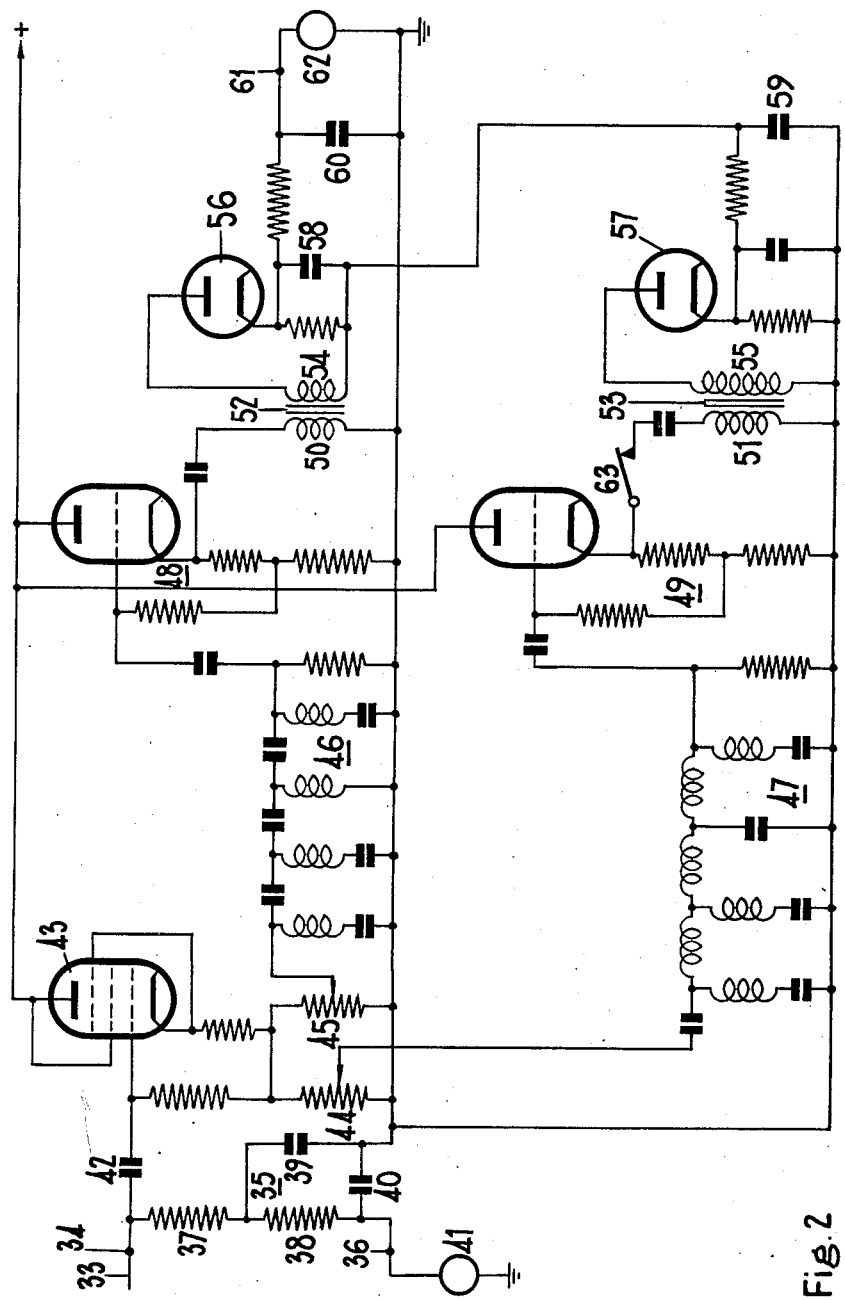

One example of equipment in accordance with the present invention will now be described with reference to the accompanying drawings in which, Fig. 1 shows the circuit diagram of a part of the equipment; and Fig. 2 shows the circuit diagram of another part of the equipment.

The equipment is adapted to check all the electric supplies to a major unit, such as a waveform generator or a modulator, of a radar installation. In Figure 1 of the drawings, the said major unit is shown by a rectangle 1 and the supplies thereto that are to be checked consist of direct current, single phase alternating current and three phase alternating current supplies.

Referring now to Figure 1, the direct current supplies are fed to the unit 1 over seven supply lines 3 to 9 and two of these lines, namely the lines 6 and 7, are earthed at the ends thereof remote from the unit 1. Alternating current supplies at a frequency of 400 cycles per second are fed over the three supply lines 10, 11 and 12 while two alternating current supplies at a frequency of 1600 cycles per second are fed over the supply lines 13 and 14. The three lower frequency alternating current supply lines 10, 11 and 12 are fed from a three-phase star-connected source (not shown) with one phase (that connected to the line 10) earthed while the higher frequency supply lines 13 and 14 are fed from a single-phase source (also not shown) one side of which (that connected to the line 13) is earthed.

A voltage summation network 15 is provided in the vicinity of the major unit 1 to supply a single signal that is a measure of the voltages on all the supply lines 3 to 14. In the drawing the network 15 is shown as being outside the unit 1 but it is to be understood that it may conveniently be located within the housing or cabinet of the unit 1.

The seven direct current supply lines 3 to 9 are connected to a common point 16 of the network 15 by way of associated resistors 17 to 23 and the nominal voltages of the direct current supplies and the values of the associated resistors are given below:

| Supply Line | Voltage | Resistor | Value of Resistor, ohms |
|---|---|---|---|
| 3 | +340 volts | 17 | 680,000 |
| 4 | +250 volts (stabilised) | 18 | 330,000 |
| 5 | +250 volts | 19 | 470,000 |
| 6 | Earthed supply line | 20 | 20,000 |
| 7 | do | 21 | 20,000 |
| 8 | −230 volts | 22 | 820,000 |
| 9 | −250 volts (stabilised) | 23 | 820,000 |

A resistor 24 having a value of 820 ohms is connected between the common point 16 and a test terminal 25 of the radar unit 1. The value of this resistor 24 is chosen so that the direct current supplies present a source resistance of 10,000 ohms at the test terminal 25.

During operation there is a voltage of 115 volts between each pair of lines 10, 11 and 12 of the three 400 cycles per second alternating current supplies and these supply lines are connected to a second common point 26 of the network 15 by way of associated resistors 27, 28 and 29. The two resistors 28 and 29 connected between the two "live" supply lines 11 and 12 and this common point 26 each has a value of 180,000 ohms while the resistor 27 has a value of 20,000 ohms. The two 1600 cycles per second supply lines 13 and 14 also have a voltage of 115 volts between them and two resistors 30 and 31 of 100,000 ohms and 20,000 ohms are connected between the "live" and earthed supplies respectively and the common point 26. A capacitor 32 having a value of 1.0 microfarads is connected between the common point 26 and the test terminal 25.

Thus, when the electric supplies are being correctly fed to the major unit 1 of the radar installation the signal developed at the test terminal 25 consists of three components, namely a direct current component having a voltage of 11 volts, a 400 cycles per second component having a voltage of 5.0 volts and a 1600 cycles per second component having a voltage of 5.2 volts.

The signal developed at the test terminal 25 is fed over a suitable lead 33 to a monitoring unit, the circuit of which is shown in Figure 2 of the accompanying drawings.

Referring now to Figure 2, the signal supplied over the lead 33 is applied to a terminal 34. A low-pass filter 35 is connected between this terminal 34 and a first output terminal 36, this filter 35 consisting of two like resistors 37 and 38 that are connected in series between the two terminals and two like capacitors 39 and 40 that are connected between earth and the junction of the two series-connected resistors 37 and 38 and the output terminal 36 respectively. A voltmeter 41 is connected between the output terminal 36 and earth while the voltage developed at this terminal 36 has a nominal value of 10 volts when the appropriate direct current supplies are present on the lines 3 to 9 (Figure 1) at the unit 1. When, however, any one of these direct current supplies fails (for example by one of the lines 3 to 9 being broken), there is a change in the voltage at this output terminal 36 and consequently a change in the voltmeter reading.

If the voltmeter 41 is of the type comprising a pointer or index which is arranged to move over a dial, the dial may have a central portion with which the pointer is in register when the direct current supplies are present on the lines 3 to 9. Thus if the pointer is deflected away from this central portion of the dial it is an indication that there is a fault in one or more of the direct current supplies. For ease of reading the said central portion of the dial may be differently coloured from the remainder of the dial.

The alternating current components of the signal developed at the terminal 34 are fed through a capacitor 42 to the control grid of a pentode thermionic valve 43 which is arranged to operate as a cathode follower stage. Two potentiometers 44 and 45 are connected in parallel in the cathode circuit of the valve 43 and two filters 46 and 47 are arranged to be supplied from the tapping points of these two potentiometers 44 and 45 respectively. The filter 46 is a high-pass filter arranged to select the 1600 cycles per second component from the signal supplied to the input terminal 34 while the other filter 47 is a low-pass filter which is arranged to select the 400 cycles per second component.

The signal passed by each of these filters 46 and 47 is fed through an associated cathode follower stage 48 or 49 to the primary winding 50 or 51 of an associated step-up transformer 52 or 53. The signal developed across each of the secondary windings 54 and 55 of these transformers 52 and 53 is rectified by means of a diode thermionic valve 56 or 57, the two resulting unidirectional voltages being developed across capacitors 58 and 59 respectively. The voltages across these two capacitors 58 and 59 are added together and fed through a low-pass filter 60 to a second output terminal 61.

When the appropriate alternating current supplies are present on the lines 10 to 14 (Figure 1) at the unit 1, the voltage developed at the output terminal 61 has a nominal value of 10 volts but when one of the alternating current supplies fails, there is a change in this voltage. The 400 and 1600 cycles per second supplies contribute 6 and 4 volts respectively to this 10 volts so that failure of any one of the alternating current supplies produces approximately the same change in the voltage supplied to the terminal 61.

A voltmeter 62 is connected between the output terminal 61 and earth and this meter 62 is arranged to indicate whether or not the alternating current supplies are present on the lines 10 to 14 at the unit 1 in similar manner to that in which the voltmeter 41 gives an indication of the state of the direct current supplies.

If the voltmeter 62 gives a reading showing that the alternating current supplies are faulty, it is desirable to know whether it is a 400 cycles per second or 1600 cycles per second fault and for this purpose a switch 63 is provided between the cathode follower stage 49 and the primary winding 51 of the transformer 53 normally fed from that stage. Thus, when there is a fault in the alternating current supplies, by observing the voltmeter 62 and opening and closing this switch, it is possible for an operator to determine the frequency of the faulty supply.

I claim:

1. Electric test equipment comprising a plurality of leads for carrying respectively a plurality of electric supplies which have at least two different frequencies, a test signal lead, an impedance network connected between said plurality of leads and said test signal lead and supplying to said test signal lead a test signal which has components of at least said two frequencies and which is so dependent upon all said supplies that failure of any one supply results in the test signal having a detectable difference compared with when there is no such failure, and testing means which is connected to said test signal lead and which is responsive to any change in the test signal corresponding to failure of any one of said supplies.

2. Electric test equipment comprising a plurality of leads for carrying respectively a plurality of electric supplies which have at least two different frequencies, means connected to said leads to derive from said supplies a test signal which has components of all the frequencies of said supplies and which is so dependent upon all the supplies that failure of any one supply results in the test signal having a detectable difference compared with when there is no such failure, and testing means which is connected to the previously mentioned means and which is responsive to any change in the test signal corresponding to failure of any one of said supplies.

3. Electric test equipment as set forth in claim 2 wherein one of said frequencies is zero so that the supplies having that frequency are in fact direct current supplies.

4. Electric test equipment as set forth in claim 2 wherein some of said supplies are alternating current supplies having a first frequency and other supplies are alternating current supplies having a second frequency, the means to derive the test signal being arranged so that the test signal contains two components having the first and second frequencies respectively.

5. Electric test equipment as set forth in claim 4 wherein the testing means comprises first and second filters to select from the test signal components having the first and second frequencies respectively, a first rectifier circuit to derive a unidirectional voltage having a value dependent upon the signal having said first frequency supplied by the first filter, a second rectifier circuit to derive a unidirectional voltage having a value dependent upon the signal having said second frequency supplied by the second filter, means to add together the voltages supplied by the first and second rectifier circuits, and means responsive to the voltage supplied by the last mentioned means.

6. Electric test equipment comprising a first group of leads for carrying a plurality of electric supplies which have a first frequency, a second group of leads for carrying a plurality of electric supplies having a second frequency, first means which is connected to all the leads of the first group and which is arranged to derive from the supplies on those leads a first test signal which has the first frequency and which has a voltage so dependent upon all the supplies on the first group of leads that failure of any one of those supplies results in the first test signal having a detectable difference compared with when there is no such failure, second means which is connected to all the leads of the second group and which is arranged to derive from the supplies of those leads a second test signal which has the second frequency and which has a voltage so dependent upon all the supplies on the second group of leads that failure of any one of those supplies results in the second test signal having a detectable difference compared with when there is no such failure, means to derive a composite test signal by adding together the test signals supplied by the first and second means, means responsive to the component of the composite test signal having the first frequency to give an indication when any of the supplies having the first frequency fails, and means responsive to the component of the test signal having the second frequency to give an indication of failure of any of the supplies having the second frequency.

7. Electric test equipment comprising a plurality of leads for carrying respectively a plurality of electric supplies which have at least two different frequencies, a test signal lead, and an impedance network connected between said plurality of leads and said test signal lead and supplying to said test signal lead a test signal which has components of all the supply frequencies and which is so dependent upon all the said supplies that failure of any one of said supplies results in the test signal having a detectable difference compared with when there is no such failure.

References Cited in the file of this patent

UNITED STATES PATENTS

| | | |
|---|---|---|
| 1,935,289 | Evans | Nov. 14, 1933 |
| 2,468,398 | Griffin | Apr. 26, 1949 |
| 2,742,611 | Antos et al. | Apr. 17, 1956 |